United States Patent [19]

Carpenter, Jr.

[11] Patent Number: 4,467,390

[45] Date of Patent: Aug. 21, 1984

[54] LIGHTNING PROTECTOR AND FILTER

[76] Inventor: Roy B. Carpenter, Jr., 9444 Terra Blanca, Whittier, Calif. 90603

[21] Appl. No.: 406,019

[22] Filed: Aug. 6, 1982

[51] Int. Cl.3 .................................................. H02H 9/06

[52] U.S. Cl. ...................................... 361/56; 361/111; 361/119; 361/120; 333/12; 333/17 L

[58] Field of Search ............... 361/120, 119, 118, 117, 361/56, 111, 91; 333/260, 12, 17 L, 17 M, 32, 226, 225, 207; 338/20, 216, 220

[56] References Cited

U.S. PATENT DOCUMENTS

| | | | |
|---|---|---|---|
| 2,408,420 | 10/1946 | Ginzton | 333/260 X |
| 2,968,776 | 1/1961 | Book | 333/226 X |
| 3,274,447 | 9/1966 | Nelson | 361/119 |
| 3,663,901 | 5/1972 | Forney, Jr. | 333/260 |
| 3,711,794 | 1/1973 | Tasca et al. | 333/260 X |
| 3,777,219 | 12/1973 | Winters | 361/111 X |
| 3,863,111 | 1/1975 | Martzloff | 361/119 |
| 4,145,729 | 3/1979 | Hayward | 361/120 X |
| 4,236,188 | 11/1980 | Prochazka | 361/119 X |

*Primary Examiner*—Patrick R. Salce

[57] ABSTRACT

A coaxial, cross-shaped connector unit for insertion into a coaxial conductor line operating at VHF and higher frequencies, utilizing two right-angle conductor and shell legs for arresting the excessive voltages and two other specific shell legs for the installation of arc-extinguishing means and wave-length matching adjustment, respectively.

1 Claim, 1 Drawing Figure

LIGHTNING PROTECTOR AND FILTER

DESCRIPTION OF PRIOR ART

Figure 1:
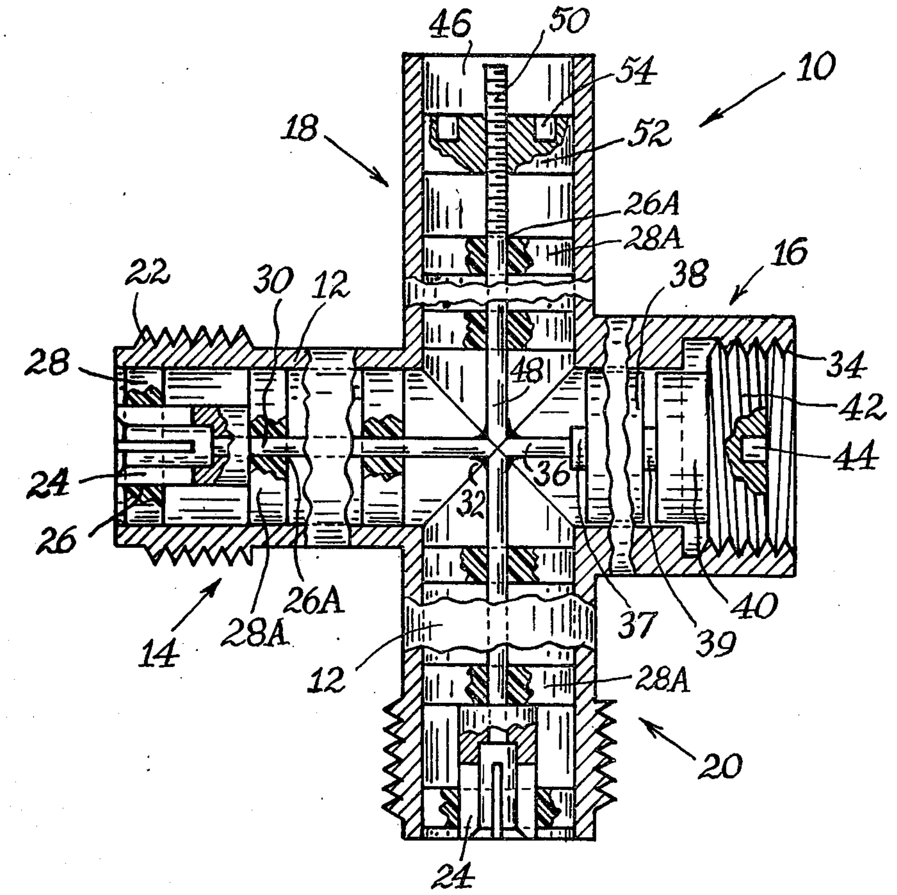

Various, so-called, surge shunts are known, especially, for the protection of radio antenna systems, claiming to protect said systems from damage caused by high-voltage transients entering these systems. However, those accessories provide no protection against actual lightning and are not adjustable so as to match their impedances with specific operational system frequencies and other system parameters.

SUMMARY OF INVENTION

The subject of this invention is a four-legged coaxial connector whereby the four legs are disposed in right angles to each other, thereby forming a cross-shaped tubular structure. Counting, say, in a clockwise direction, the first leg accepts the incoming coaxial line which is solidly and internally carried to the fourth leg, positioned at an angle of 90 degress to said first leg, for its connection with the outgoing coaxial line leading to the equipment to be protected. It should be noted that this right-angle, coaxial conductor arrangement constitutes one concept element of this invention, considering that the current caused by any high voltage, be it due to a system transient, or lightning, prefers a straight conductor path over a right-angle deflection to the to be protected equipment and its cable connection.

The second leg, positioned at an angle of 180 degrees to said fourth leg, is equipped with an adjustable stub, shorting the coaxial inner conductor to the connector shell serving as the outer conductor. The stub adjustment allows for the exact impedance matching of the entire unit to the ¼ wave length of the respective operating frequency. This feature presents another concept element of this invention.

The third leg, positioned at an angle of 180 degrees to said first leg, is internally connected to the conductive union between said first and said fourth leg, terminating at the open end opposite said union in the required transient-suppression and lightning protection elements, which are readily removable for inspection and for replacement upon an inflicted damage, respectively.

Another characteristic of this improvement is its compact assembly which can be manufactured with standardized practices and at reasonable cost.

Further, all coaxial electric and mechanical connections utilize standardized contact configurations and fastening means, respectively, allowing for the connection to and from coaxial cables which are customary in the trade.

Additional advantages of the subject improvement will become apparent from the following description and the accompanying drawing.

In the drawing, forming a part of this application:

FIG. 1 indicates, schematically and in cross-section, a typical coaxial lightning protector and filter in accordance with this invention.

Referring now to the drawing and its FIG. 1, wherein like reference numerals designate like or corresponding parts, the coaxial connector unit 10 is of cross-shaped, tubular construction consisting of a shell 12 having the tubular legs 14, 16, 18 and 20 extending radially and at right angles with respect to each other from the geometric, tubular cross-over center. The wall thicknesses and diameters of said tubular legs vary from each other depending on the operational parts lodged within them.

The tubular leg 14 is equipped at its end with an external screw thread 22 to accommodate the internally-threaded nut of a coaxial cable connector (not shown). A female connector sleeve 24 is positioned in the axis of said tubular leg 14 to receive a male connector pin of a said, in this case incoming, coaxial cable connector (not shown) and mounted axially in the center bore 26 of at least one electrically insulating spacer 28. A solid electric conductor 30 is connected to the base of said female connector sleeve 24 extending therefrom to the union 32 in the geometric, tubular center of the coaxial connector unit 10. Said conductor 30 is positioned within a correspondingly dimensioned center bore 26A of at least one respective electrically insulating spacer 28A.

The tubular leg 20 is identical to the tubular leg 14 in every respect, obviating an itemized recapitulation of its component parts, except that it accommodates an outgoing coaxial cable (not shown).

The tubular leg 16 having an internal thread 34 along its end portion and, therefore, requiring a somewhat thicker wall than the other tubular legs, contains the following component parts, described in the order starting at the union 32 in the tubular center of the unit 10 as follows:

a comparatively short, solid inner conductor 36 originating from and connected with one of its two ends to said union 32; its short length may obviate the need for insulating spacers 28A, such as shown for other situations, a gas-filled tube 38 having two terminals 37 and 39, of which terminal 37 is connected with the other end of said short, solid inner conductor 36, a substantially cylindrical resistance disc 40 of carbon or a comparable resistance material, having a flat top and a flat bottom surface, its bottom surface being in contact with the terminal 39 of said gas-filled tube 38 and a cylindrical plug 42 made of brass, having an external thread formed on its lateral side for engagement with said internal thread 34 in said leg 16, a slot 44 formed in its exposed top surface for negotiating said plug 42 so as to apply pressure against the top surface of said resistance disc 40 and thereby clamping said gas-filled tube 38 securely against the free end of said short solid conductor 36 and establishing a dependable electric series connection among the enumerated component parts—per se—and from said union 32 to the shell 12 which serves as the return path.

The tubular leg 18 has the shape of a hollow cylinder 46 throughout its length. A solid inner conductor 48 is connected with one of its two ends to said union 32 and extends with its other end, having a thread 50 formed thereon, to the open end of said tubular leg 18, said solid inner conductor 40 being mounted axially in the center bore 26A of at least one electrically insulating spacer 28A. A shorting stub 52 of an electrically conductive material is in contact with the inside surface of the cylinder 46 and said inner conductor 48. Said shorting stub 52 has the shape of a shallow cylinder, an internal thread formed axially therein to engage with said external thread 50 formed at the end portion of said inner conductor 48 and has at least one recess 54 formed in its surface which is exposed to be accessible from the outside of the unit 10, said at least one recess 54 provided for, say, the engagement of a spanner wrench type tool to effect the travel of said stub 52 to a position within said leg 18 resulting in a $\frac{1}{4}$ wave length impedance match of the coaxial unit 10 in conformance with a specific operating frequency and to vary this setting to another required wave length match, selectively.

Based on the foregoing, both the application and the operation of the unit in accordance with this invention may be self-explanatory. Both the incoming and outgoing coaxial cable connections are, once made, permanent. The positioning of the plug 42 requires but little dexterity and remains set unless or until the removal of the gas-filled tube 38 and of the resistance disc 40 becomes necessary for inspection and replacement, respectively. The only physically adjustable part is the stub 52; its negotiation in conjunction with the applicable electric measuring instruments can be readily performed by technicians familiar with these practices.

The unit 10 may be equipped with mounting brackets (not shown) or, because of its light weight and rugged construction, be installed on suitable existing supports with commercially available clamps, or be left floating among otherwise fastened cables.

It is understood that the herein shown and described component parts, their arrangements within the unit and the configuration of the assembly are but illustrative and that variations, modifications and alterations are feasible within the spirit of these teachings.

What is claimed is:

1. A lightning protector and filter comprising in combination:
   - a substantially tubular shell structure of an electrically conductive material having in angular and integral displacement and in a plane a first, a second, a third and a fourth substantially tubular leg structure,
   - said first tubular leg structure suitable for the connection with the outer conductor of an incoming two-conductor coaxial circuit and cable,
   - a first center conductor positioned axially within said first tubular leg structure and extending from the geometric tubular center of said tubular shell structure to the end of said first tubular leg structure,
   - a female coaxial-type sleeve mounted on and connected with the end of said first center conductor,
   - said sleeve and said center conductor supported by at least one dielectric spacer,
   - said fourth tubular leg structure suitable for the connection with the outer conductor of an outgoing two-conductor coaxial circuit and cable,
   - a fourth center conductor positioned axially within said fourth tubular leg structure and extending from the geometric tubular center of said tubular shell structure to the end of said fourth tubular leg structure,
   - a female, coaxial-type sleeve mounted on and connected with the end of said fourth center conductor,
   - at least one dielectric spacer supporting said sleeve and said center conductor within said fourth tubular leg structure,
   - a second center conductor having two ends and supported by at least one dielectric spacer,
   - a gas-filled tube having two terminals,
   - a resistance disc having a top and a bottom surface,
   - a plug made of brass having a flat bottom and a slotted top surface,
   - said second center conductor, said gas-filled tube, said resistance disk and sid plug mounted axially and in this sequence from the geometric tubular center of said shell structure within said second tubular leg structure,
   - said second center conductor connected with one of its two ends to said first and said fourth center conductor and with its other end to one of the two terminals of said gas-filled tube,
   - the second terminal of said gas-filled tube connected to the bottom surface of said resistance disc,
   - the top surface of said resistance disc in contact with the bottom surface of said plug,
   - said plug in contact with said second tubular leg structure,
   - a third center conductor having one plain and one threaded end portion, positioned axially within said third tubular leg structure and supported by at least one dielectric spacer and connected with its plain end with said first, said second and said fourth center conductor and extending from the geometric tubular center of said shell structure to the end of said third tubular leg structure,
   - a stub made of an electrically conductive material having an exposed top and a bottom and an internal thread formed axially therein and at least one recess formed in its exposed top,
   - said stub mounted on and engaging with its thread the end of said third center conductor and thereby making contact with the inside surface of said third tubular leg structure,
   - said at least one recess serving for the engagement with a suitable tool for the positioning of said internally threaded stub on said threaded end of said third center conductor for the adjustment of the impedance of said lightning protector and filter corresponding to a specific operational wave length and a discrete fraction thereof.

* * * * *